United States Patent
Fersman et al.

(10) Patent No.: US 11,166,178 B2
(45) Date of Patent: Nov. 2, 2021

(54) METHODS AND DEVICES FOR MAINTAINING A DEVICE OPERATED FUNCTION

(71) Applicant: TELEFONAKTIEBOLAGET LM ERICSSON (PUBL), Stockholm (SE)

(72) Inventors: Elena Fersman, Stockholm (SE); Jing Fu, Solna (SE); Hongxin Liang, Upplands Väsby (SE); Vlasios Tsiatsis, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 459 days.

(21) Appl. No.: 15/316,947

(22) PCT Filed: Jun. 18, 2014

(86) PCT No.: PCT/SE2014/050749
§ 371 (c)(1),
(2) Date: Dec. 7, 2016

(87) PCT Pub. No.: WO2015/195006
PCT Pub. Date: Dec. 23, 2015

(65) Prior Publication Data
US 2017/0127302 A1    May 4, 2017

(51) Int. Cl.
*H04W 84/20*     (2009.01)
*H04W 24/04*     (2009.01)
(Continued)

(52) U.S. Cl.
CPC ............ *H04W 24/04* (2013.01); *H04H 60/13* (2013.01); *H04L 45/026* (2013.01); *H04L 69/28* (2013.01);
(Continued)

(58) Field of Classification Search
CPC . H04W 24/00; H04W 52/0274; H04W 74/06; H04W 4/005; H04W 84/20; H04H 60/13; H04L 45/026
(Continued)

(56) References Cited

U.S. PATENT DOCUMENTS 6,901,275 B1 * 5/2005 Aoyagi ................. H04W 84/20
                                                                455/574
6,934,566 B2 * 8/2005 Kang ................. H04W 52/0216
                                                                455/574
(Continued)

FOREIGN PATENT DOCUMENTS

EP         1 223 715 A1    7/2002

OTHER PUBLICATIONS

Extended European Search Report in corresponding European Application No. EP 14 89 5130 dated Apr. 7, 2017.
(Continued)

*Primary Examiner* — Said M Elnoubi
(74) *Attorney, Agent, or Firm* — Patent Portfolio Builders PLLC

(57) ABSTRACT

Methods and devices for maintaining a device-operated function. A first device initially operates as an active master with responsibility to execute the device-operated function by automatically performing one or more operation tasks according to certain operational parameters and gaining knowledge when performing the operation tasks. Meanwhile, a second device is acting as a passive standby device. When the first device cannot or should not operate as the active master anymore, e.g. due to low battery, the responsibility is transferred to the second device by transferring the operational parameters and the knowledge from the first device to the second device. Then, the second device operates as the active master with responsibility to execute the
(Continued)

device-operated function according to the operational parameters and using the knowledge if required.

26 Claims, 5 Drawing Sheets

(51) Int. Cl.
*H04H 60/13* (2008.01)
*H04L 12/751* (2013.01)
*H04L 29/06* (2006.01)
*H04W 52/02* (2009.01)
*H04W 74/06* (2009.01)

(52) U.S. Cl.
CPC ....... *H04W 52/0274* (2013.01); *H04W 74/06* (2013.01); *H04W 84/20* (2013.01)

(58) Field of Classification Search
USPC ................................................ 455/574, 507
See application file for complete search history.

(56) References Cited

U.S. PATENT DOCUMENTS

| | | | | |
|---|---|---|---|---|
| 7,447,746 B2* | 11/2008 | Yamaguchi | ........... | H04W 84/20 |
| | | | | 370/331 |
| 7,554,932 B1* | 6/2009 | Shurmantine | ......... | H04W 88/04 |
| | | | | 370/279 |
| 7,647,427 B1* | 1/2010 | Devarapalli | ............ | G06F 15/16 |
| | | | | 709/245 |
| 9,622,203 B2* | 4/2017 | Premy | ............... | H04W 56/0015 |
| 9,648,662 B2* | 5/2017 | Herrala | .................. | H04W 84/20 |
| 9,762,295 B2* | 9/2017 | Brandsma | ............ | H04B 5/0062 |
| 2005/0033816 A1 | 2/2005 | Yamaguchi et al. | | |
| 2006/0066449 A1 | 3/2006 | Johnson | | |
| 2008/0129525 A1 | 6/2008 | Barrus et al. | | |
| 2011/0022411 A1 | 1/2011 | Hjelm et al. | | |

OTHER PUBLICATIONS

Anonymous, "Acquisition of device diagnostics and log data from Medical or Consumer Devices using NFC," IP.com, Jan. 31, 2012, IPCOM000214490D.

Castillo-Secilla et al., "Lifetime Evaluation Model for Wireless Sensor Networks based on Mote Redundancy," 2012 7th Iberian Conference on Information Systems and Technologies (CISTI), Jun. 20-23, 2012, Madrid, ES.

Ohnishi et al., "Designing Redundancy Toward Building Easily Manageable Wireless Sensor Networks for Humans," The Second International Conference on Sensor Technologies and Applications, Aug. 25-31, 2008, Cap Esterel, FR.

Wang et al., "Self-Organizing Redundancy-Cellular Architecture for Wireless Sensor Networks," Wireless Communications and Networking Conference, 2005 IEEE, Mar. 13-17, 2005, New Orleans, LA, US.

International Search Report and Written Opinion dated Mar. 11, 2015 in related International Application No. PCT/SE2014/050749.

Office Action in corresponding/related India Application No. 201617038788 dated Dec. 6, 2019. (All references not cited herewith have been previously made of record.).

* cited by examiner

METHODS AND DEVICES FOR MAINTAINING A DEVICE OPERATED FUNCTION

TECHNICAL FIELD

The present disclosure relates generally to a first device, a second device and methods therein, for maintaining a device-operated function.

BACKGROUND

Equipment and procedures have been developed for monitoring various premises and areas that need to be supervised, where a plurality of devices are installed at different locations within a monitored area to perform some predefined operational task such as measuring, counting, detecting or sensing, and typically reporting the result to a central server or the like. These devices may be configured to measure or observe some metric or parameter of interest, such as temperature, pressure, voltage, light, motion, sound, presence of objects, presence of smoke, etc. Some common examples of locations and areas that might need to be supervised include public and private buildings, infrastructures, vehicles, industrial premises, machines, communication networks, and so forth. One or more such devices may be connected through a communication network to a server in a monitoring center, and report sensor data comprising information about measurements and observations to the server, e.g. at regular intervals or triggered by occurrence of an event, e.g. detection of motion, sound, vibration, light, smoke, temperature rise, etc.

In this disclosure, the term "device" will be used for short to represent any communication terminal that automatically performs one or more operation tasks which may include measuring, counting or sensing some metric or parameter, as well as reporting or registering any information related to measurements and observations performed by the device, depending on its functionality. Any such operation task may be referred to as a "device-operated function".

An example of how an arrangement for supervision of a particular area may be realized in practice is schematically illustrated in FIG. 1 where a plurality of devices "D" are distributed at different locations within a schematically shown monitored area 100, the devices D being configured to perform various measurements and observations at their positions and to send reports over a communication network 102 to a central monitoring server 104, as indicated by incoming arrows "R". The server 104 may also command one or more of the devices D to perform some operation task, as indicated by outgoing arrows "C". The reports R are communicated over various nodes and links in the network 102 to arrive at the monitoring server 104 for review and evaluation.

However, it is a problem that such devices used for device-operated functions are typically powered by a battery of limited lifetime, and sooner or later the device cannot operate due to drained battery and a person will need to go to the device and change or recharge the battery. There is also a risk that the device at some point gets damaged or starts to operate improperly or not at all for whatever reason. For example, it may be necessary to repair or replace the device in order to restore proper operation.

In either case, a person is required to go to the physical location where the device resides and make sure it operates properly again which may be a burden especially if the operation of several such devices needs to be maintained in this way. For example, the device may be located far away or may be difficult or virtually impossible to access for whatever reason, and there may further be a need to maintain operation of devices at several locations distributed over a large area where the devices may operate on some extensive infrastructure such as networks for communication, power distribution, or lightning. It may therefore be quite costly and time consuming to have one or more persons going to all these locations, e.g. just to change or recharge their batteries from time to time, or to replace the devices.

Another problem is that a device may continue to operate improperly or not at all for an extended period of time before the fault is discovered and before a person has taken time to go to the location where the device resides and restore the device's operation. This period of lacking operation is naturally more or less unwanted and may cause various drawbacks depending on the function of the device.

SUMMARY

It is an object of embodiments described herein to address at least some of the problems and issues outlined above. It is possible to achieve this object and others by using devices and methods therein as defined in the attached independent claims.

According to one aspect, a method is performed by a first device maintaining a device-operated function. In this method, the first device operates as an active master with responsibility to execute the device-operated function by automatically performing one or more operation tasks according to one or more operational parameters configured in the first device and gaining knowledge when performing the one or more operation tasks. At some point, the first device then transfers the responsibility to a second device acting as a passive standby device, by transferring the one or more operational parameters and the knowledge to the second device. Thereby, the second device is enabled to operate as the active master and to automatically perform the one or more operation tasks according to the one or more operational parameters and using the knowledge if required.

According to another aspect, a first device is operable for maintaining a device-operated function. The first device comprises means configured to operate as an active master with responsibility to execute the device-operated function by automatically performing one or more operation tasks according to one or more operational parameters configured in the first device and gaining knowledge when performing the one or more operation tasks. The first device also comprises means configured to transfer the responsibility to a second device acting as a passive standby device, by transferring the one or more operational parameters and the knowledge to the second device, thereby enabling the second device to operate as the active master and to automatically perform the one or more operation tasks according to the one or more operational parameters and using the knowledge if required.

According to another aspect, a method is performed by a second device for maintaining a device-operated function. In this method, the second device acts as a passive standby device when a first device is operating as an active master with responsibility to execute the device-operated function by automatically performing one or more operation tasks according to one or more operational parameters configured in the first device and gaining knowledge when performing the one or more operation tasks. When deciding to take over the responsibility from the first device, the second device obtains the one or more operational parameters and the knowledge from the first device, and operates as the active master with responsibility to execute the device-operated function by automatically performing the one or more operation tasks according to the one or more operational parameters and using the knowledge if required.

According to another aspect, a second device is operable for maintaining a device-operated function. The second device comprises means configured to act as a passive standby device when a first device is operating as an active master with responsibility to execute the device-operated function by automatically performing one or more operation tasks according to one or more operational parameters configured in the first device and gaining knowledge when performing the one or more operation tasks. The second device also comprises means configured to decide to take over the responsibility from the first device, and to obtain the one or more operational parameters and the knowledge from the first device. The second device also comprises means configured to operate as the active master with responsibility to execute the device-operated function by automatically performing the one or more operation tasks according to the one or more operational parameters and by using the knowledge if required.

According to another aspect, a method is performed in a system of devices comprising a first device and a second device, for maintaining a device-operated function. In this method, the first device is operating as an active master with responsibility to execute the device-operated function by automatically performing one or more operation tasks according to one or more operational parameters configured in the first device and gaining knowledge when performing the one or more operation tasks. The second device is acting as a passive standby device. Then the responsibility is transferred from the first device to the second device by transferring the one or more operational parameters and the knowledge from the first device to the second device. After that, the second device is operating as the active master with responsibility to execute the device-operated function by automatically performing the one or more operation tasks according to the one or more operational parameters and using the knowledge if required.

A computer program is also provided which comprises instructions which, when executed on at least one processor, cause the at least one processor to carry out the method above. A carrier is also provided which contains the above computer program, wherein the carrier is one of an electronic signal, optical signal, radio signal, or computer readable storage medium.

The above methods and devices may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1:
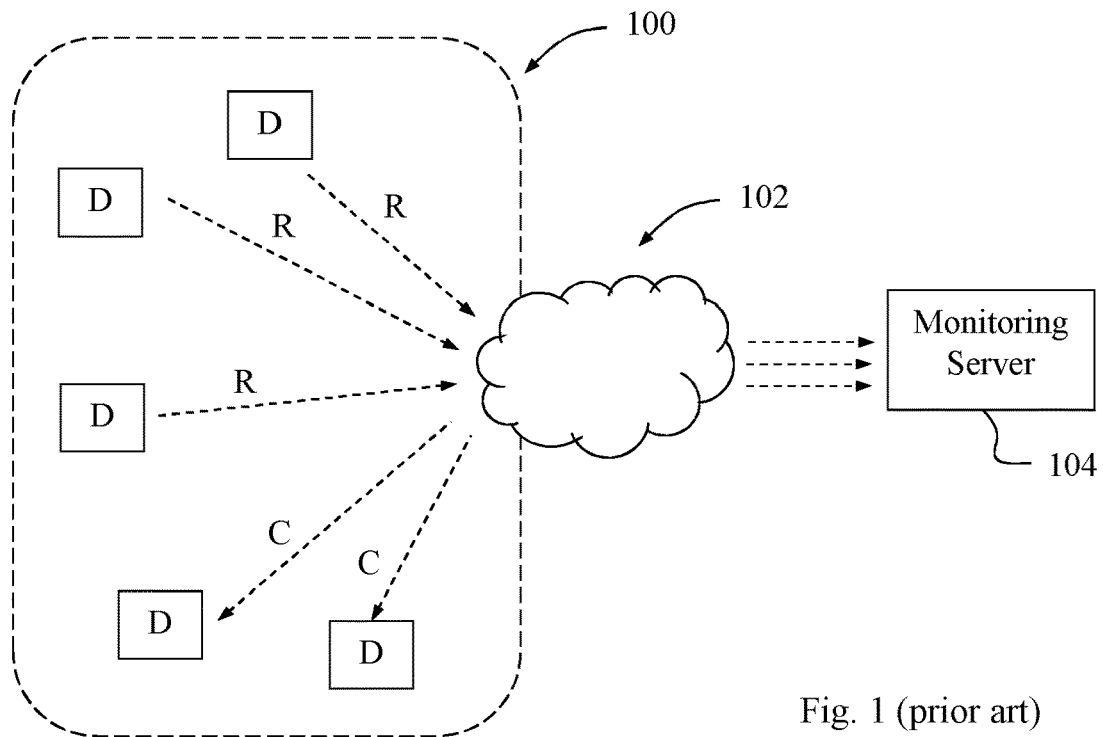
FIG. 1 is a communication scenario illustrating how devices may operate, according to the prior art.

Briefly described, a solution is provided to reduce the need for a person to go to the location of a device in order to maintain a device-operated function. This is achieved by using at least two devices at the location including a first device initially operating as an active master and a second device initially acting as a passive standby device and being ready to take over as active master as follows. When operating as active master, the first device has a responsibility to execute the device-operated function by performing one or more operation tasks according to one or more operational parameters, and also gaining useful knowledge in the meantime.

The one or more operational parameters may in this context, without limitation, include any settings and schemes configured in the first device which control how it should perform the one or more operation tasks, such as defining metrics to be measured or sensed, a scheme for sending reports to a server, a machine learning algorithm, and so forth. The knowledge may in this context, without limitation, refer to any information that the first device has computed or derived from measurements and/or observations that it has performed over time, e.g. statistical parameters or data related to a machine-learning function or the like. It is further assumed that the first and second devices are able to communicate with each other, e.g. over a local radio interface which may be achieved by using Bluetooth or similar, or over a fixed communication link or over a communication network.

When it is detected that the first device cannot, or should not, operate as active master any longer, e.g. when battery power in the first device is low so that the first device will soon be disabled, the responsibility to execute the device-operated function is transferred to the second device which then automatically takes over to operate as active master instead of the first device. In order to transfer the responsibility to the second device, the one or more operational parameters and said knowledge are transferred from the first device to the second device, e.g. over the local radio interface. The second device is then enabled to operate as the active master by performing the one or more operation tasks according to the one or more operational parameters and using the knowledge if required. Hence, the first device is automatically replaced by the second device without requiring that a person must go to the first device in order to maintain the device-operated function.

The above can be accomplished in several different ways, depending on implementation. For example, the first device itself may detect that it cannot, or should not, operate properly any longer, e.g. by sensing low battery or some malfunction, and the first device may then transfer the responsibility and send the operational parameters and knowledge to the second device in anticipation of improper operation or similar issue. Alternatively, the first device may suddenly just stop working, which can be referred to as "sudden death", e.g. due to some fatal damage or lost connectivity or drained battery. For example, the second device may in this case detect the improper operation if it polls the first device on a regular basis and when it suddenly gets no response therefrom. In this case, the second device may retrieve the above operational parameters and knowledge from a passive memory in the first device, e.g. a Radio-Frequency Identification, RFID tag, over a local communication link using some type of Near Field Communication, NFC. Alternatively, the first device may have sent the operational parameters and knowledge to the second device in beforehand, e.g. on a regular basis.

A third alternative in this context is that when a server receives reports from the first device pertaining to measurements or observations according to the device-operated function, the server detects that the first device cannot or should not operate any more, e.g. when the first device is not reporting as expected, or when a pre-set timer has expired. In that case, the server may send an instruction to the second device to take over the responsibility from the first device. The second device may obtain the above operational parameters and knowledge as described above.

It is further possible to have more than one "second" device arranged to act as passive standby devices, such that the responsibility to operate as active master can be transferred in a succession of devices from one to another, e.g. when their batteries are drained one by one. Thereby, the function can be maintained automatically for an extended time thus without requiring that a person must go to the site where the devices reside.

It is thus an advantage that the need for a person to go and replace or repair a faulty device can be substantially reduced when using this solution. Another advantage is that the first device will not continue to operate improperly or not at all for any extended period of time, since it will be replaced automatically and without delay by the second device, and possibly the second device can be replaced in the same manner in turn once it cannot or should not operate as master device.

Figure 2:
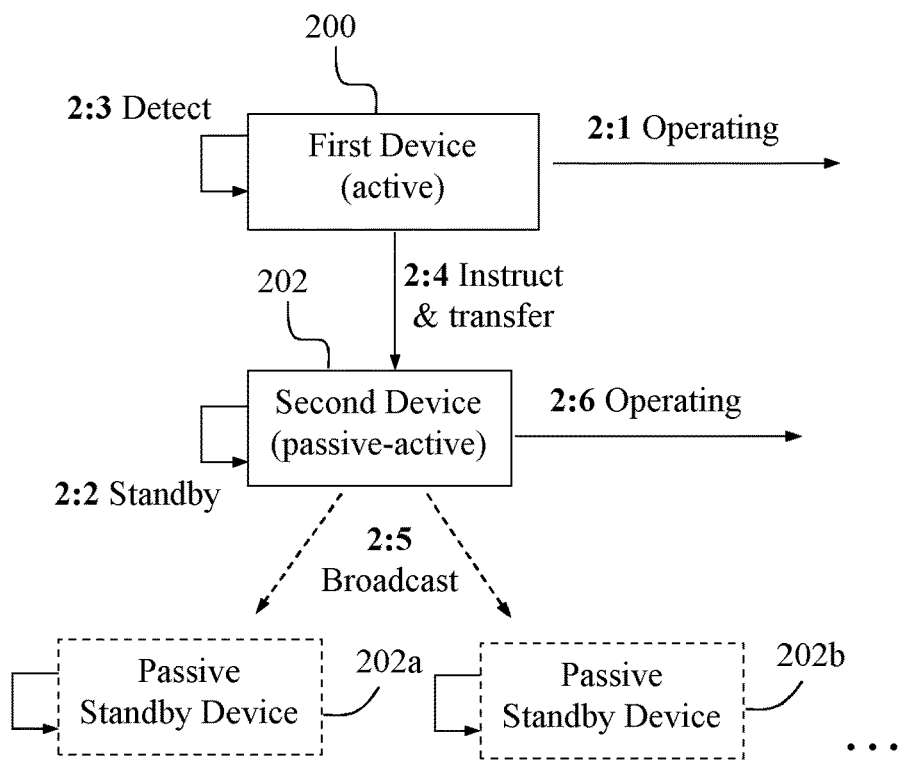
FIG. 2 is a block diagram with actions for maintaining a device-operated function, according to some possible embodiments.

Some examples of how the solution could be used will now be described with reference to FIG. 2 illustrating a first device 200 initially operating as an active master and a second device 202 initially acting as a passive standby device which is located close to the first device 200. In this case, further passive standby devices may be arranged at the same site, as indicated by numerals 202a, 202b . . . , thus forming a pool of passive standby devices ready to take over the responsibility to operate as active master. FIG. 2 thus illustrates a system of devices comprising the first device 200 and, at least, the second device 202, for maintaining a device-operated function.

A first action 2:1 illustrates that the first device 200 is in initially operating as an active master with responsibility to execute the device-operated function by automatically performing one or more operation tasks according to one or more operational parameters configured in the first device and gaining knowledge when performing the one or more operation tasks. As mentioned above, the gained knowledge may comprise information that the first device has computed or derived from measurements and/or observations, e.g. used as input to a machine-learning function or the like.

Another action 2:2 illustrates that the second device 202 initially acts as a passive standby device, i.e. it waits without operating actively. Actions 2:1 and 2:2 are both ongoing at the same time and it can be assumed that acting as a passive standby device consumes very little battery power, if any, as compared to operating as an active master. Then the first device 200 detects in this case that it cannot or should not operate as the active master, e.g. when detecting drained battery or some malfunction or lost connectivity to a communication network, which is indicated by a detecting action 2:3. Another action 2:4 illustrates that the responsibility is transferred from the first device 200 to the second device 202, which includes transferring the one or more operational parameters and the knowledge from the first device 200 to the second device 202.

In this example, it is thus the first device 200 that detects that it cannot or should not operate as the active master, and therefore the first device 200 also sends the one or more operational parameters and the gained knowledge to the second device 202 once detecting this, assuming that it is still capable of communicating with the second device 202. Other alternatives of how the one or more operational parameters and the knowledge may be transferred have been mentioned above. It was also mentioned above that the second device or a server, not shown, may alternatively detect that the first device is not operating, which will be described in more detail later below.

Some examples of operational parameters for controlling how the master device should operate have been given above. Other operational parameters that could be transferred in action 2:4 are the first device's communication settings, e.g. a hardware address that is globally unique for each communication device, which can be re-used by the second device 202 for communication with a central server, not shown, which communicates with the currently operating master device. Thereby, the communication between the new master device, i.e. the second device 202, and the server can be simplified since the new master device can act as if it is the same as the old one and no server updates are needed for the change of master device from 200 to 202. This is possible to do if the hardware addresses are stored in a flash memory which the device can read/write.

An optional action 2:5 further illustrates that the second device 202 may broadcast a message to the other devices 202a, 202b . . . indicating that the second device 202 is now acting as the active master. In a final shown action 2:6, the second device 202 is operating as the active master with responsibility to execute the device-operated function by automatically performing the one or more operation tasks according to the one or more operational parameters and using the knowledge if required.

An example of a procedure, performed by a first device for maintaining a device-operated function, will now be described with reference to the flow chart in FIG. 3. Some possible but non-limiting embodiments will also be described which may be used for the first device. In this procedure, it is assumed that at least one further device is acting as a passive standby device, referred to as a second device, and is arranged to take over responsibility to execute the device-operated function from the first device, and that the second device is able to communicate with the first device, e.g. using a local radio interface such as Bluetooth.

A first action 300 illustrates that the first device is operating as an active master with responsibility to execute the device-operated function by automatically performing one or more operation tasks according to one or more operational parameters configured in the first device and gaining knowledge when performing the one or more operation tasks. Some examples of such operational parameters and knowledge have been given above.

In a possible embodiment, the first device may send the one or more operational parameters and the knowledge to the second device on a regular basis prior to the second device being instructed to take over the responsibility, which is illustrated by an optional action 302. This embodiment may be useful in case the first device would abruptly stop operating by sudden death, e.g. due to drained battery, lost connectivity, damage, and so forth, such that it is unable to send the operational parameter(s) and knowledge after the event. Thus, in order to keep the operational parameter(s) and the knowledge up-to-date in the first device, actions 300 and 302 may be repeated regularly as indicated by the dashed arrow since the operational parameter(s) and the knowledge in the first device may change over time. Depending on the implementation, this transfer may be done at relatively long intervals to save battery.

In another possible embodiment, the first device may save the one or more operational parameters and the knowledge in a passive memory in the first device, e.g. whenever they are updated, to enable the second device to retrieve the currently valid one or more operational parameters and the knowledge from the passive memory in case the first device stops to work. This retrieval is possible even when the first device has stopped to work, e.g. when using an RFID tag or the like as passive memory. This embodiment may likewise be useful in the case of sudden death.

In another action 304 it is determined whether the responsibility should be transferred from the first device to the second device or not. If not, i.e. the first device can continue to operate as the master device, the process will return to action 300. If it is determined that the responsibility should be transferred, an optional action 306 illustrates that the first device may instruct the second device to take over the responsibility. As mentioned above, the need for transferring the responsibility may be detected by the first device or by the second device or by a server receiving reports from the first device.

In further possible embodiments, the first device may instruct the second device to take over the responsibility when the first device detects at least one of: its battery power is low, the first device is malfunctioning, a pre-set timer has expired. In the latter case, the first device may have been configured to operate as the master device only for a predetermined length of time according to the pre-set timer. In this way, a succession of devices may take turns to operate as the master device until the pre-set timer expires when the next device takes over, and so forth. Thereby, it can be foreseen at which point in time all the devices at the site have been used, or "consumed", and when it is time for a person to go out and replace or recharge the devices on site.

Anyhow, after it has been determined that the responsibility should be transferred from the first device to the second device, the responsibility is transferred to the second device by transferring the one or more operational parameters and the knowledge to the second device, as shown by a final action 308. Thereby, the second device is enabled to operate as the active master and to automatically perform the one or more operation tasks according to the one or more operational parameters and using the knowledge if required.

In another possible embodiment as suggested above, the first device and the second device may be comprised in a system of devices and the first device may broadcast a message to the system of devices, the message indicating that the second device operates as the active master. This embodiment is useful e.g. if the system of devices is arranged such that each passive standby device polls the currently active master device at regular intervals to determine whether it continues to operate as the active master or not, which will be described in more detail later below. Once a new device has become the active master, the remaining passive standby devices will thereby know which device to send their polls to, i.e. to the new master device. Each time the responsibility is to be transferred, a new device may be selected from the passive devices to act as active master, e.g. according to a preset succession or randomly.

Another example of a procedure, performed by a second device for maintaining a device-operated function, will now be described with reference to the flow chart in FIG. 4. Some possible but non-limiting embodiments will also be described which may be used for the second device.

A first action 400 illustrates that the second device is acting as a passive standby device when a first device is operating as an active master with responsibility to execute the device-operated function by automatically performing one or more operation tasks according to one or more operational parameters configured in the first device and gaining knowledge when performing the one or more operation tasks. As shown by an optional action 402, the second device may receive the one or more operational parameters and the knowledge from the first device on a regular basis prior to the second device being instructed to take over the responsibility, which corresponds to action 302 in FIG. 3. As mentioned above, this transfer may be done at relatively long intervals to save battery.

In another action 404, the second device decides to take over the responsibility from the first device, which may be done in different ways. In a possible embodiment, the second device may decide to take over the responsibility when receiving an instruction to do so, either from the first device or from a server when the server detects at least one of: the first device is not reporting as expected, a pre-set timer has expired. In another possible embodiment, the second device may wake up from a sleep mode at regular intervals to enable reception of the instruction to take over the responsibility. Thereby, the battery consumption can be minimized in the second device by being awake as little as possible.

In yet another possible embodiment, the second device may wake up from a sleep mode at regular intervals and send a poll to the first device to determine whether the first device continues to operate as an active master. If the first device responds that it continues to operate as active master, the second device can return to sleep mode again and wait until it is time again to send a poll to the first device. On the other hand, the second device will be able to decide to take over the responsibility when detecting that the first device does not respond to the poll which indicates that the first device is not operating.

Another action 406 illustrates that the second device obtains the one or more operational parameters and the knowledge from the first device, which action may actually coincide with action 402 in the case when the transfer is done in beforehand as described for actions 402, 302 above. In other words, action 406 may be performed before action 404 in the form of action 402. Alternatively, the second device may receive the one or more operational parameters and the knowledge from the first device once it has been detected that the first device cannot or should not operate as active master anymore. In another possible embodiment, the second device may retrieve the one or more operational parameters and the knowledge from a passive memory in the first device, such as an RFID tag or the like, which has also been described above.

A final action 408 illustrates that the second device operates as the active master with responsibility to execute the device-operated function by automatically performing the one or more operation tasks according to the one or more operational parameters and using the knowledge if required. In another possible embodiment, the first device and the second device may be comprised in a system of devices and the second device may broadcast a message to the system of devices, the message indicating that the second device operates as an active master, which has also been described above for action 2:5 in FIG. 2 and in connection with FIG. 3.

Figure 5:
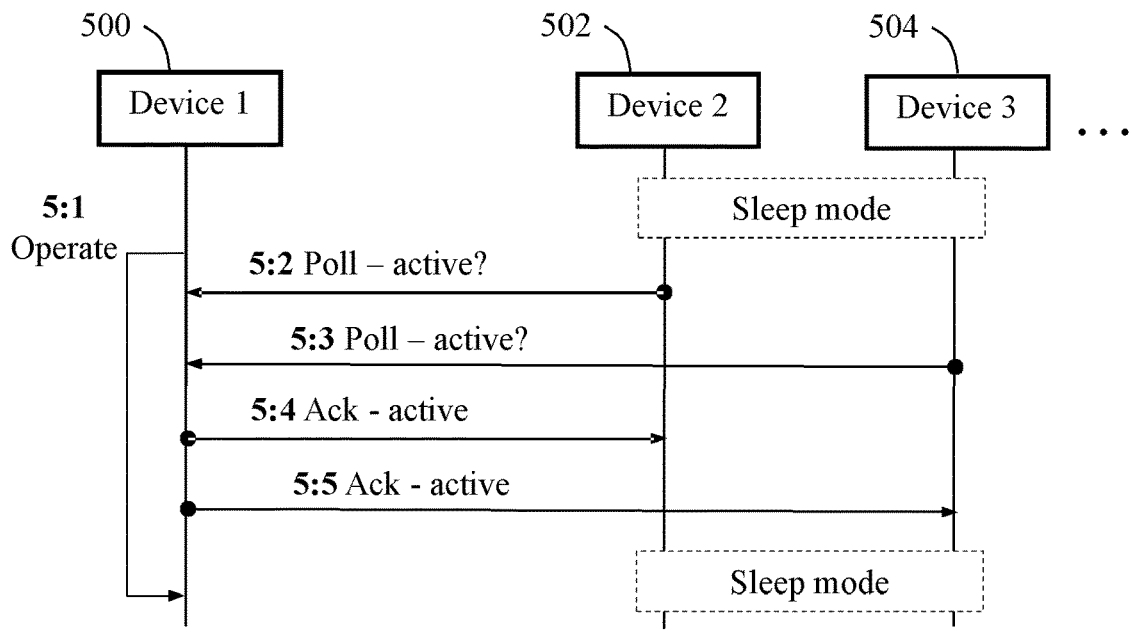
FIG. 5 is a signaling diagram illustrating an example of a procedure before responsibility is transferred, according to further possible embodiments.

It was mentioned above that the second device may send a poll to the first device at regular intervals to determine whether the first device continues to operate as an active master or not. FIG. 5 illustrates how this may be done in the case where a first device 500 operates as active master by performing one or more operation tasks according to one or more operational parameters and gaining knowledge in this process, while two or more further devices 502, 504 . . . are employed acting as passive standby devices. A first action 5:1 illustrates that the first device 500 continues to operate as active master throughout the shown procedure.

An action 5:2 illustrates that a passive standby device 502 wakes up from its sleep mode and sends a poll to the first device 500 and an action 5:3 illustrates that another passive standby device 504 likewise wakes up from its sleep mode and sends a poll to the first device 500, to determine whether device 500 continues to operate as an active master. In response to the polls, the first device 500 sends an acknowledge to each device 502, 504 in actions 5:4 and 5:5, respectively, to indicate that it remains active. The passive standby devices 502 and 504 can therefore return to sleep mode again, as shown in the figure, and wait until it is time to send the next poll to the first device 500.

Figure 6:
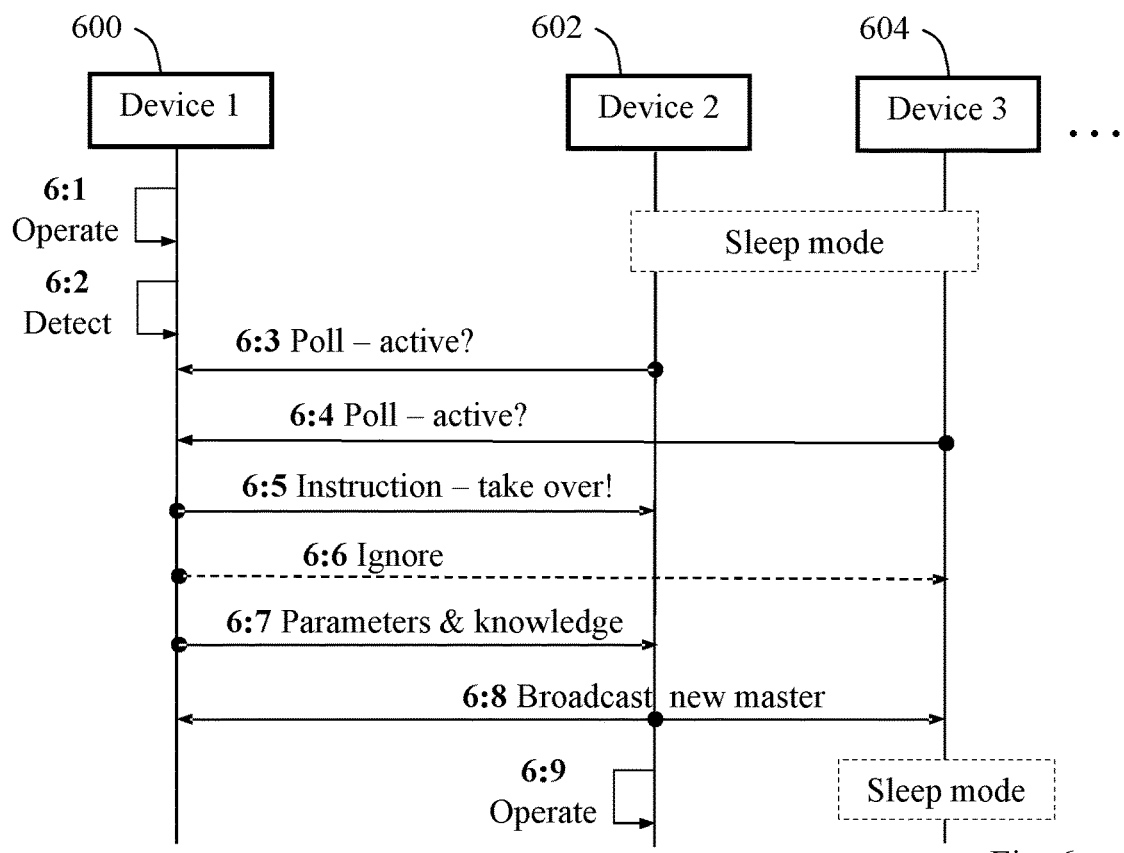
FIG. 6 is a signaling diagram illustrating an example of a procedure when responsibility is transferred, according to further possible embodiments.

It was mentioned above that the first device may instruct the second device to take over the responsibility to operate as active master when the first device detects that it cannot or should not operate as master anymore, e.g. when detecting low battery power, or some malfunction, or that a pre-set timer has expired. FIG. 6 illustrates an example of how this may be done involving a first device 600 initially operating as active master by performing one or more operation tasks according to one or more operational parameters and gaining knowledge in this process, while two or more further devices 602, 604 . . . are initially acting as passive standby devices and being in sleep mode as indicated in the figure.

A first action 6:1 illustrates that the first device 600 is operating as active master, and a next action 6:2 illustrates that the first device 600 detects that it cannot or should not operate as master anymore for whatever reason. Another action 6:3 illustrates that a passive standby device 602 wakes up from its sleep mode and sends a poll to the first device 600 and an action 6:4 illustrates that another passive standby device 604 likewise wakes up from its sleep mode and sends a poll to the first device 600, to determine whether device 600 continues to operate as an active master. Having detected that it cannot or should not operate as the active master, the first device 600 sends a response to the poll from device 602, in an action 6:5, which is an instruction to take over the responsibility and act as the active master. As indicated above, the passive standby device 602 may be selected to become the next master device according to a preset succession or randomly.

The first device 600 may also send a response to the poll from device 604, in an optional action 6:6, basically indicating that the poll is ignored and effectively implying that the first device 600 will stop operating as active master and that device 604 should continue to act as a passive standby device. A further action 6:7 illustrates that the first device 600 sends the one or more operational parameters and the knowledge to the device 602. In another action 6:8, device 602 also broadcasts a message announcing that it will operate as the active master from now on.

A final action 6:9 illustrates that device 602 operates as the active master with responsibility to execute the device-operated function by automatically performing the one or more operation tasks according to the one or more operational parameters and using the knowledge if required. Meanwhile, the other device(s) 604 . . . can return to sleep mode, as shown in the figure, and wait until it is time to wake up again send a poll to the new device 602 according to the message broadcasted therefrom in action 6:8.

Figure 7:
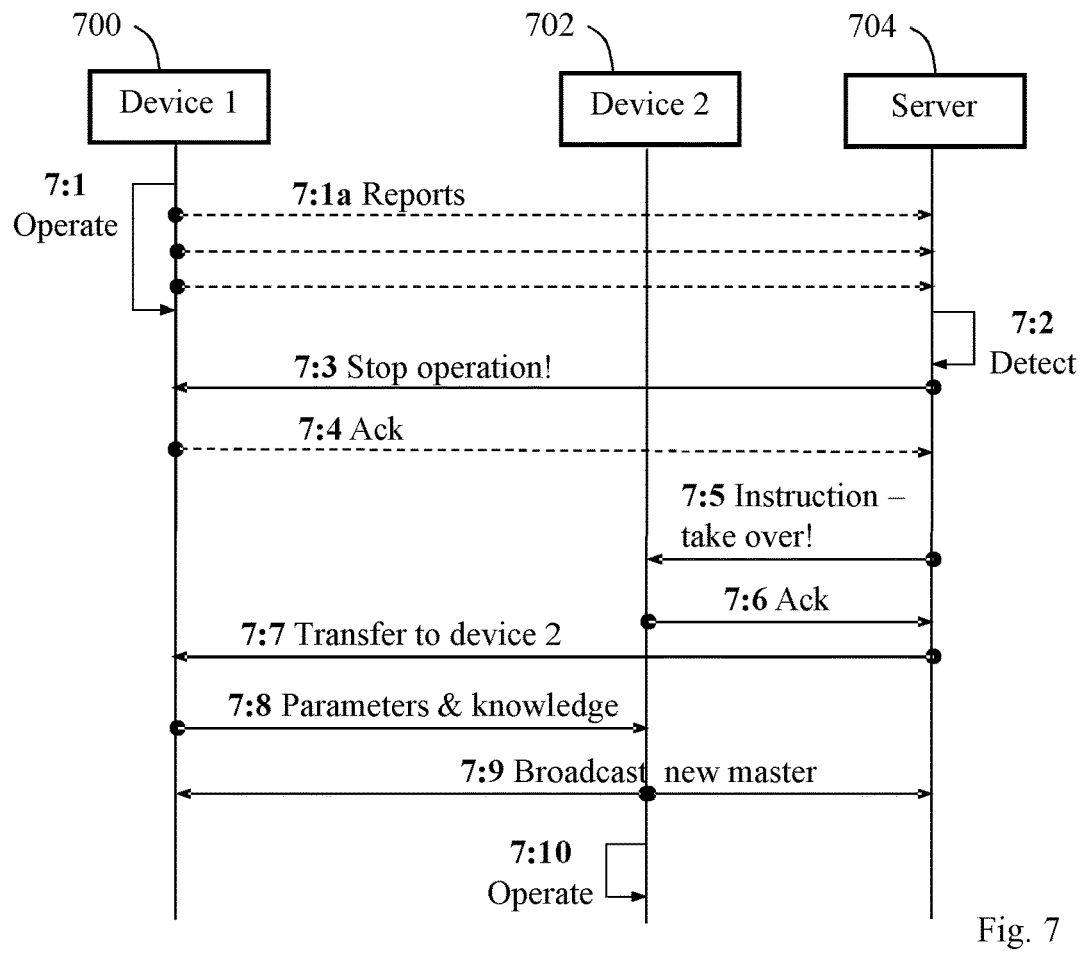
FIG. 7 is a signaling diagram illustrating another example of a procedure when responsibility is transferred, according to further possible embodiments.

It was mentioned above that the need for transferring the responsibility of master device from a first device to a second device may be detected by a server receiving reports from the first device, and that the server may send an instruction to the second device to take over the responsibility from the first device. FIG. 7 illustrates how this may be done in the case where a first device 700 operates as active master by performing one or more operation tasks according to one or more operational parameters and gaining knowledge in this process, while a second device 702 is acting as passive standby device. A server 704 is also show in this figure receiving reports from the currently active master device.

A first action 7:1 illustrates that the first device 700 initially operates as active master which involves sending reports to the server 704, as indicated by action 7:1a. Another action 7:2 illustrates that the server 704 detects that the first device cannot or should not operate any more, e.g. when the first device 700 is not reporting as expected, or when a pre-set timer has expired. For example, the server 704 may detect that the first device 700 has stopped reporting altogether or that the incoming reports indicate that the first device 700 is not working properly by reporting peculiar measurement values or the like. The server 704 then instructs the first device 700 to stop its operation, in an action 7:3, which may be acknowledged by the first device 700 to stop its operation in an action 7:4, provided that it is capable to respond at all.

The server 704 then instructs the second device 702 to take over the responsibility from the first device 700 to operate as master device, in an action 7:5, which is acknowledged by the second device 702 in another action 7:6. The server 704 may also instruct the first device 700, in an action 7:7, to transfer its one or more operational parameters and gained knowledge to the second device 702, which is duly made in another action 7:8. If this is not possible at this point, e.g. due to disablement of the first device 700, the second device 702 may still be able to retrieve the one or more operational parameters and the knowledge from a passive memory in the first device 700, as described above.

In another action 7:9, the second device 702 also broadcasts a message announcing that it will operate as the active master from now on. A final action 7:10 illustrates that the second device 702 operates as the active master with responsibility to execute the device-operated function by automatically performing the one or more operation tasks according to the transferred one or more operational parameters and using the transferred knowledge if required.

Figure 8:
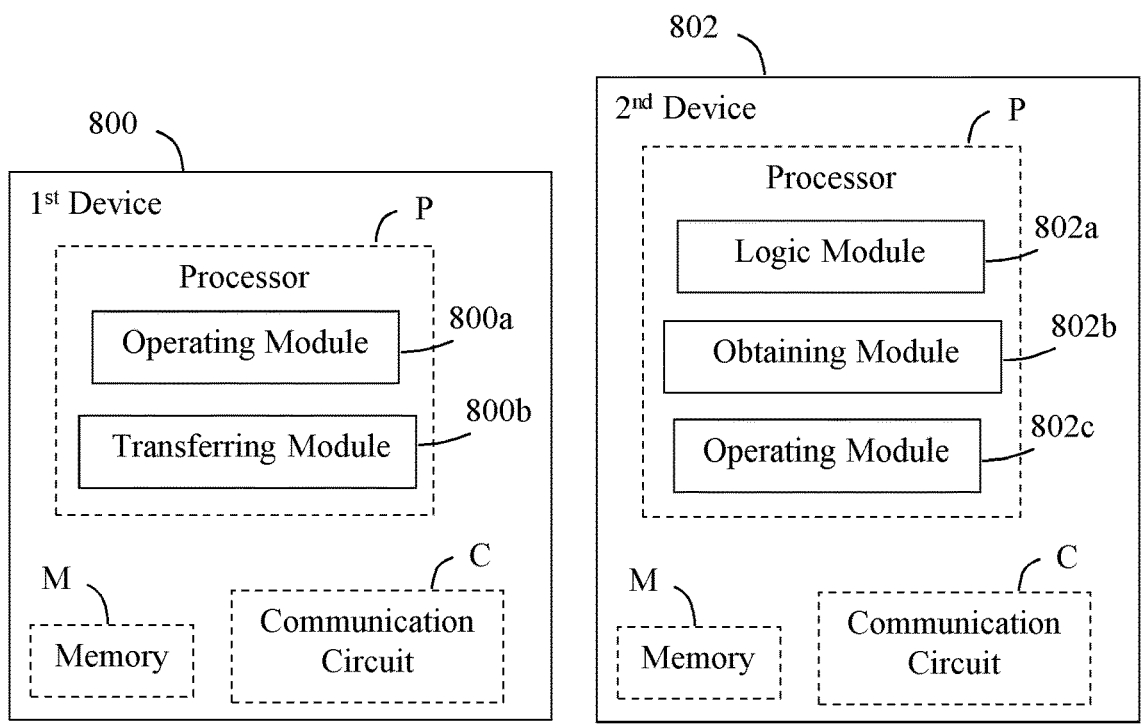
FIG. 8 is a block diagram illustrating a first device and a second device in more detail, according to further possible embodiments.

The block diagram in FIG. 8 illustrates a detailed but non-limiting example of how a first device 800 and a second device 802, respectively, may be structured to bring about the above-described solution and embodiments thereof. In this figure, the first device 800 and the second device 802 may be configured to operate according to any of the examples and embodiments of employing the solution as described above, where appropriate, and as follows. Each of the first device 800 and the second device 802 is shown to comprise a processor "P", a memory "M" and a communication circuit "C" with suitable equipment for transmitting and receiving signals with information in the manner described herein.

The communication circuit C in the first device 800 and the second device 802 comprises suitable equipment configured for communication with each other e.g. over a local communication link, and with a server, not shown, e.g. over a communication network such as the Internet or other public or private network.

Figure 3:
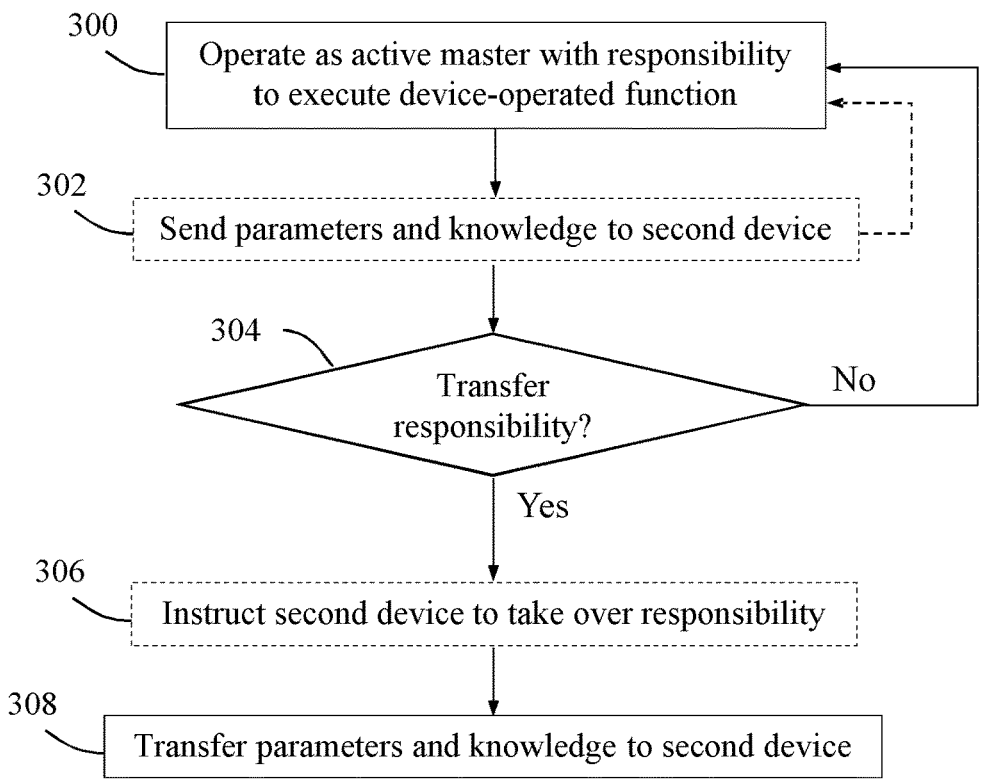
FIG. 3 is a flow chart illustrating a procedure in a first device, according to further possible embodiments.
Figure 4:
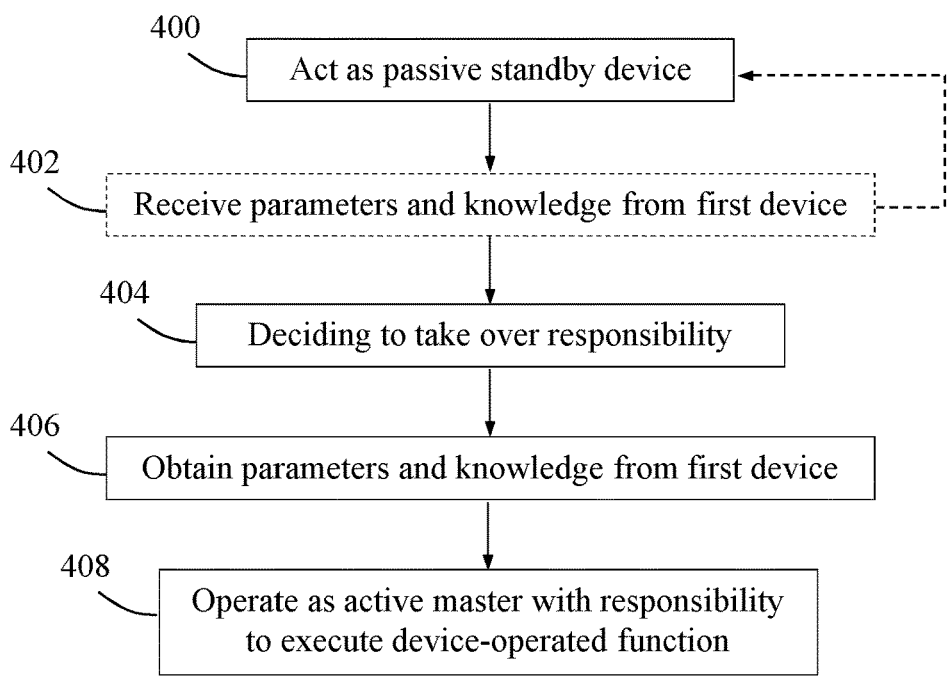
FIG. 4 is a flow chart illustrating a procedure in a second device, according to further possible embodiments.

The first device 800 comprises means configured or arranged to perform at least some of the actions 300-308 of the flow chart in FIG. 3 in the manner described above, while the second device 802 comprises means configured or arranged to perform at least some of the actions 400-408 of the flow chart in FIG. 4 in the manner described above. These actions may be performed by means of functional modules in the respective processor P in the first device 800 and in the second device 802 as follows.

The first device 800 is operable for maintaining a device-operated function, and the first device comprises means configured to operate as an active master with responsibility to execute the device-operated function by automatically performing one or more operation tasks according to one or more operational parameters configured in the first device 800 and gaining knowledge when performing the one or more operation tasks. This operating activity may be performed by an operating module 800a in the first device 800, e.g. in the manner described for action 300 above.

The first device 800 also comprises means configured to transfer the responsibility to the second device 802 acting as a passive standby device, by transferring the one or more operational parameters and the knowledge to the second device, thereby enabling the second device 802 to operate as the active master and to automatically perform the one or more operation tasks according to the one or more operational parameters and using the knowledge if required. This transferring activity may be performed by a transferring module 800b in the first device 800, e.g. in the manner described for at least some of the actions 302-308 above.

The second device 802 is operable for maintaining a device-operated function, and the second device comprises means configured to act as a passive standby device when the first device 800 is operating as an active master with responsibility to execute the device-operated function by automatically performing one or more operation tasks according to one or more operational parameters configured in the first device and gaining knowledge when performing the one or more operation tasks.

The second device 802 also comprises means configured to decide to take over the responsibility from the first device. The above activities of acting as a passive standby device and deciding to take over the responsibility may be performed by a logic module 802a in the second device 802, e.g. in the manner described for at least some of the actions 400-404 above. The second device 802 further comprises means configured to obtain the one or more operational parameters and the knowledge from the first device 800.

This obtaining activity may be performed by an obtaining module 802b in the second device 802, e.g. in the manner described for action 406 and/or action 402 above.

The second device 802 further comprises means configured to operate as the active master with responsibility to execute the device-operated function by automatically performing the one or more operation tasks according to the one or more operational parameters and by using the knowledge if required. This activity of operating as the active master may be performed by an operating module 802c in the second device 802, e.g. in the manner described for action 408 above.

It should be noted that FIG. 8 illustrates various functional modules in the first device 800 and the second device 802, respectively, and the skilled person is able to implement these functional modules in practice using suitable software and hardware. Thus, the solution is generally not limited to the shown structures of the first device 800 and the second device 802, and the functional modules 800a-b and 802a-c may be configured to operate according to any of the features described in this disclosure, where appropriate.

The functional modules 800a-b and 802a-c described above can be implemented in the first device 800 and in the second device 802, respectively, by means of program modules of a respective computer program comprising code means which, when run by the processor P in each device causes the first device 800 and the second device 802 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the first device 800 and the second device 802 in the form of a memory having a computer readable medium and being connected to the processor P. The computer program product or memory M in each of the first device 800 and the second device 802 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective first and second devices 800, 802.

The solution described herein may be implemented in each device by a computer program comprising instructions which, when executed on at least one processor, cause the at least one processor to carry out the actions according to any of the above embodiments. The solution may also be implemented at each device in a carrier containing the above computer program, wherein the carrier is one of an electronic signal, optical signal, radio signal, or computer readable storage medium.

Figure 9:
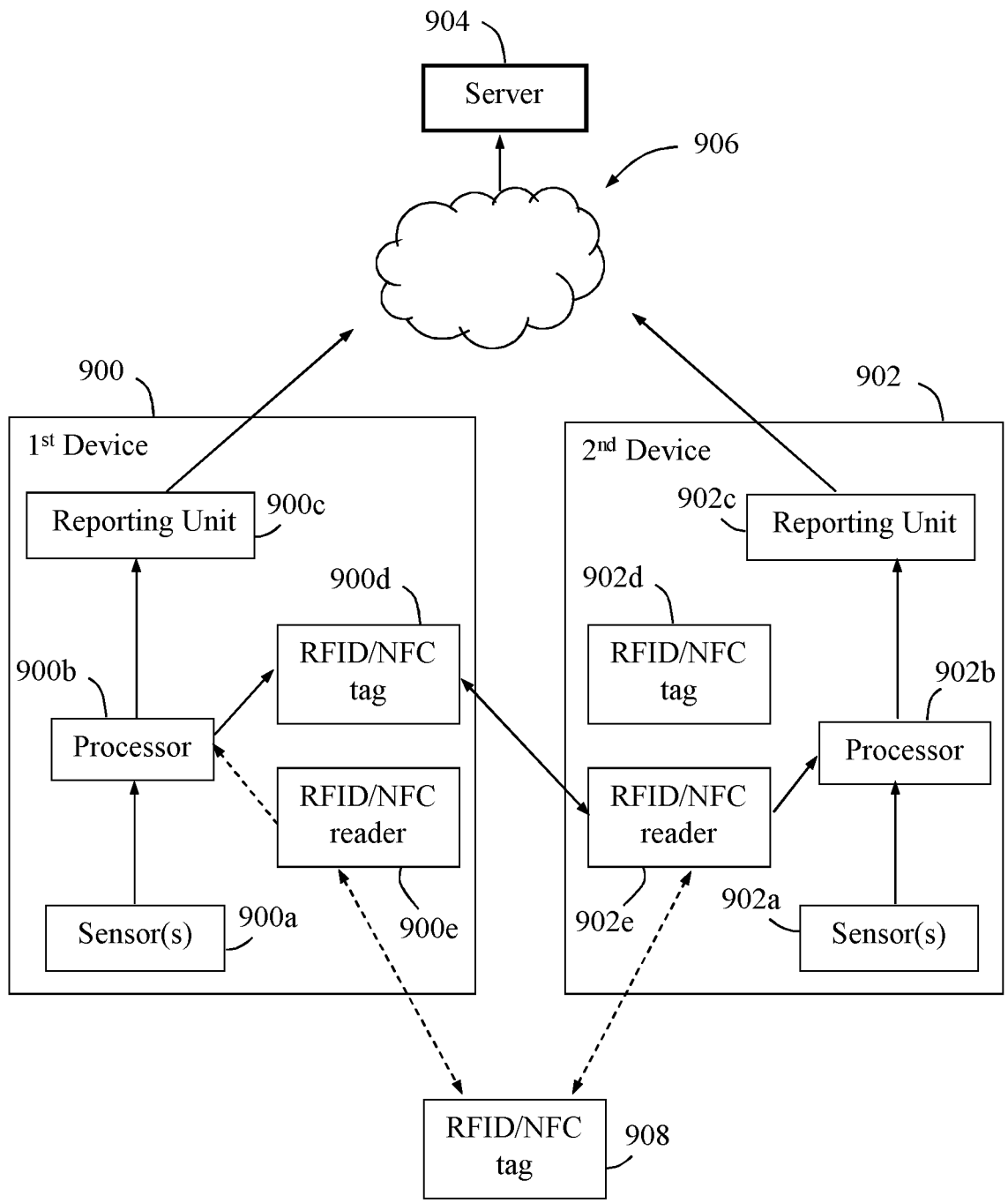
FIG. 9 is a block diagram illustrating another example of how a first device and a second device may be configured and operate, according to further possible embodiments.

It was mentioned above that the second device may retrieve the one or more operational parameters and the knowledge from a passive memory in the first device, such as an RFID tag or the like, e.g. if the first device stops working without having transferred the above information to the second device. FIG. 9 illustrates how this may be done in the case where a first device 900 operates as active master by performing one or more operation tasks according to one or more operational parameters and gaining knowledge in this process, while a second device 902 is acting as passive standby device. A server 904 is also shown receiving reports from the currently active master device over a communication network 906 such as the Internet or other public or private network.

Each of the first device 900 and the second device 902 comprises one or more sensors 900a, 902a, a processor 900b, 902b, and a reporting unit 900c, 902c. Each device 900, 902 may further comprise an RFID tag 900d, 902d which can be used as a passive memory, and also an RFID reader 900e, 902e, wherein each RFID reader 900e, 902e is configured to retrieve information from the RFID tag 902d, 900d at the opposite device using NFC. Alternatively, a separate shared RFID tag 908 may be used to which the currently active master device may write its operational parameters and/or gained knowledge. The shared RFID tag 908 may thus be arranged close to the first and second devices 900, 902 so that both devices 900 and 902 can write and read information on it. In this case, no RFID tag 900d, 902d is needed within the respective device 900, 902 which only need to have functionality for writing and reading on the RFID tag 908. The RFID tags 900d, 902d, 908 and the RFID readers 900e, 902e may be used for this solution as follows.

When the first device 900 initially operates as active master it collects measurements and/or observations by means of the sensor(s) 900a and the collected measurements and/or observations are also processed by means of the processor 900b, e.g. using a machine learning algorithm. The first device 900 also sends reports accordingly to the server 906 by means of the reporting unit 900c. Furthermore, the first device 900 stores the one or more operational parameters and any knowledge it gains in the process on the RFID tag 900d or 908.

Once the first device 900 has stopped operating as the active master, e.g. in a "sudden death" manner, the second device 902 is able to use its RFID reader 902e to retrieve the one or more operational parameters and the knowledge from the RFID tag 900d in the first device 900, as indicated by a two-way arrow, or alternatively from the separate RFID tag 908 if used. When the second device 902 has taken over the responsibility to operate as master device, it will operate in the same manner as described above for the first device 900. In more detail, the second device 902 collects measurements and/or observations by means of the sensor(s) 902a and processes the collected measurements and/or observations are also by means of the processor 902b. The second device 902 will also send reports accordingly to the server 906 by means of the reporting unit 902c. Furthermore, the second device 902 stores the one or more operational parameters and any knowledge it gains in the process on its RFID tag 902d or on the separate RFID tag 908 if used.

While the solution has been described with reference to specific exemplifying embodiments, the description is generally only intended to illustrate the inventive concept and should not be taken as limiting the scope of the solution. For example, the terms "device", "active master", "standby device", "device-operated function", "operation task", "operational parameter" and "knowledge" have been used throughout this disclosure, although any other corresponding entities, functions, and/or parameters could also be used having the features and characteristics described here. The solution is defined by the appended claims.

The invention claimed is:

1. A method in a system of devices comprising a first device and a second device, for maintaining a device-operated function, the method comprising:
   the first device operating as an active master for monitoring premises with responsibility to execute the device-operated function by automatically performing one or more operation tasks to carry out the monitoring according to one or more operational parameters configured in the first device and gaining knowledge when performing the one or more operation tasks to carry out the monitoring,
   the second device acting as a passive standby device, wherein when the second device acts as the passive standby device, the second device waits without actively operating,
   transferring the responsibility from the first device to the second device by transferring the one or more operational parameters and the knowledge from the first device to the second device, and
   the second device operating as the active master for monitoring premises with responsibility to execute the device-operated function by automatically performing the one or more operation tasks to carry out the monitoring according to the one or more operational parameters and using the knowledge if required,
   wherein the second device wakes up from a sleep mode at regular intervals,
   wherein the second device takes over the responsibility when the first device cannot operate properly any longer due to malfunctioning of the first device and/or a battery is low in the first device.

2. The method according to claim 1, wherein the first device instructs the second device to take over the responsibility when the first device detects at least one of: battery power is low in the first device, the first device is malfunctioning, and a pre-set timer has expired.

3. The method according to claim 1, wherein the first device sends the one or more operational parameters and the knowledge to the second device on a regular basis prior to transferring the responsibility.

4. The method according to claim 1, wherein the first device saves the one or more operational parameters and the knowledge in a passive memory in the first device, to enable the second device to retrieve the one or more operational parameters and the knowledge from the passive memory in case the first device stops working.

5. The method according to claim 1, wherein the first device broadcasts a message to the system of devices, the message indicating that the second device operates as the active master.

6. The method according to claim 1, wherein the second device decides to take over the responsibility when receiving an instruction from the first device or from a server when the server detects at least one of: the first device is not reporting as expected, and a pre-set timer has expired.

7. The method according to claim 1, wherein the second device broadcasts a message to the system of devices, the message indicating that the second device operates as an active master.

8. The method according to claim 6, wherein the second device wakes up from the sleep mode at regular intervals to enable reception of the instruction to take over the responsibility.

9. The method according to claim 1, wherein the second device wakes up from the sleep mode at regular intervals and sends a poll to the first device to determine whether the first device continues to operate as the active master, and if the first device responds that it continues to operate as the active master, the second device returns to sleep mode again.

10. The method according to claim 9, wherein the second device decides to take over the responsibility when detecting that the first device does not respond to the poll which indicates that the first device is not operating.

11. The method according to claim 1, wherein the second device retrieves the one or more operational parameters and the knowledge from a passive memory in the first device.

12. The method of claim 1, wherein the device-operated function comprises a measuring and/or detecting function,
    wherein the one or more operation tasks relate to measuring and/or detecting,
    wherein the one or more operational parameters determine one or more settings in the first device and the one or more settings determine how the one or more operation tasks are performed, and
    wherein the knowledge is any information the first device has computed or derived from measurements and/or observations performed by the first device.

13. A system of devices for maintaining a device-operated function, the system comprising:
    a first device comprising instructions which, when executed on at least one processor, cause the first device to operate as an active master for monitoring premises with responsibility to execute the device-operated function by automatically performing one or more operation tasks to carry out the monitoring according to one or more operational parameters configured in the first device and gaining knowledge when performing the one or more operation tasks to carry out the monitoring,
    a second device comprising instructions which, when executed on at least one processor, cause the second device to act as a passive standby device, wherein when the second device acts as the passive standby device, the second device waits without actively operating,
    wherein the responsibility is transferred from the first device to the second device by transferring the one or more operational parameters and the knowledge from the first device to the second device,
    wherein, after the responsibility is transferred, the second device operates as the active master for monitoring premises with responsibility to execute the device-operated function by automatically performing the one or more operation tasks to carry out the monitoring according to the one or more operational parameters and using the knowledge if required, and
    wherein the second device wakes up from a sleep mode at regular intervals,
    wherein the second device takes over the responsibility when the first device cannot operate properly any longer due to malfunctioning of the first device and/or a battery is low in the first device.

14. The system according to claim 13, wherein the first device instructs the second device to take over the responsibility when the first device detects at least one of: battery power is low in the first device, the first device is malfunctioning, and a pre-set timer has expired.

15. The system according to claim 13, wherein the first device sends the one or more operational parameters and the knowledge to the second device on a regular basis prior to transferring the responsibility.

16. The system according to claim 13, wherein the first device saves the one or more operational parameters and the knowledge in a passive memory in the first device, to enable the second device to retrieve the one or more operational parameters and the knowledge from the passive memory in case the first device stops working.

17. The system according to claim 13, wherein the first device broadcasts a message to the system of devices, the message indicating that the second device operates as the active master.

18. The system according to claim 13, wherein the second device decides to take over the responsibility when receiving an instruction from the first device or from a server when the server detects at least one of: the first device is not reporting as expected, and a pre-set timer has expired.

19. The system according to claim 13, wherein the second device broadcasts a message to the system of devices, the message indicating that the second device operates as an active master.

20. The system according to claim 18, wherein the second device wakes up from the sleep mode at regular intervals to enable reception of the instruction to take over the responsibility.

21. The system according to claim 13, wherein the second device wakes up from the sleep mode at regular intervals and sends a poll to the first device to determine whether the first device continues to operate as the active master, and if the first device responds that it continues to operate as the active master, the second device returns to sleep mode again.

22. The system according to claim 21, wherein the second device decides to take over the responsibility when detecting that the first device does not respond to the poll which indicates that the first device is not operating.

23. The system according to claim 13, wherein the second device retrieves the one or more operational parameters and the knowledge from a passive memory in the first device.

24. The system of claim 13, wherein the device-operated function comprises a measuring and/or detecting function,
    wherein the one or more operation tasks relate to measuring and/or detecting,
    wherein the one or more operational parameters determine one or more settings in the first device and the one or more settings determine how the one or more operation tasks are performed, and
    wherein the knowledge is any information the first device has computed or derived from measurements and/or observations performed by the first device.

25. A method in a system of devices comprising a first device and a second device, for maintaining a device-operated function, the method comprising:
    the first device operating as an active master for monitoring premises with responsibility to execute the device-operated function by automatically performing one or more operation tasks to carry out the monitoring according to one or more operational parameters configured in the first device and gaining knowledge when performing the one or more operation tasks to carry out the monitoring, and
    transferring the responsibility to a second device acting as a passive standby device, by transferring the one or more operational parameters and the knowledge to the second device, thereby enabling the second device to operate as the active master for monitoring premises and to automatically perform the one or more operation tasks to carry out the monitoring according to the one or more operational parameters and using the knowledge if required,
    wherein when the second device acts as the passive standby device, the second device waits without actively operating, wherein the second device wakes up from a sleep mode at regular intervals, wherein the second device takes over the responsibility when the first device cannot operate properly any longer due to malfunctioning of the first device and/or a battery is low in the first device.

26. A method in a system of devices comprising a first device and a second device, for maintaining a device-operated function, the method comprising:

the second device acting as a passive standby device when a first device is operating as an active master for monitoring premises with responsibility to execute the device-operated function by automatically performing one or more operation tasks to carry out the monitoring according to one or more operational parameters configured in the first device and gaining knowledge when performing the one or more operation tasks to carry out the monitoring, deciding to take over the responsibility from the first device, obtaining the one or more operational parameters and the knowledge from the first device, and operating as the active master for monitoring premises with responsibility to execute the device-operated function by automatically performing the one or more operation tasks to carry out the monitoring according to the one or more operational parameters and using the knowledge if required, wherein when the second device acts as the passive standby device, the second device waits without actively operating, wherein the second device wakes up from a sleep mode at regular intervals, wherein the second device takes over the responsibility when the first device cannot operate properly any longer due to malfunctioning of the first device and/or a battery is low in the first device.

* * * * *